United States Patent [19]
Egan et al.

[11] Patent Number: 5,120,180
[45] Date of Patent: Jun. 9, 1992

[54] RAILCAR STRADDLE FOR MATERIAL HANDLING

[75] Inventors: Edward A. Egan, Wayzata; Kenneth L. Kellen, Morris, both of Minn.

[73] Assignee: Northern Con-Agg, Inc., Elk River, Minn.

[21] Appl. No.: 639,134

[22] Filed: Jan. 9, 1991

[51] Int. Cl.$^5$ .............................................. B65G 67/24
[52] U.S. Cl. .................................. 414/339; 414/394; 414/786
[58] Field of Search ............... 414/339, 786, 341, 343, 414/345, 459, 460, 391, 392, 394, 399

[56] References Cited

U.S. PATENT DOCUMENTS

| | | | |
|---|---|---|---|
| 899,180 | 9/1908 | McGiffert | 414/392 |
| 1,263,170 | 4/1918 | Webb | 414/394 |
| 1,361,832 | 12/1920 | Crilly | 414/394 X |
| 1,678,245 | 7/1928 | Dickinson et al. | 414/339 X |
| 2,127,972 | 8/1938 | Hutchinson et al. | 414/343 X |
| 2,272,693 | 2/1942 | De Jute | 414/394 X |
| 2,801,014 | 7/1957 | Colson | 414/394 X |
| 3,107,803 | 10/1963 | Glosup et al. | 414/786 X |
| 3,329,289 | 7/1967 | Fritz | 414/394 |
| 3,376,988 | 4/1968 | Klosk | 414/339 X |
| 3,570,689 | 3/1971 | Eaton | 414/394 X |
| 3,881,612 | 5/1975 | Wells | 414/394 |
| 4,096,954 | 6/1978 | Buckner | 414/339 |
| 4,099,635 | 7/1978 | Leonard et al. | 414/339 X |
| 4,128,180 | 12/1978 | Mellious | 414/339 |
| 4,175,902 | 11/1979 | Herzog et al. | 414/339 |
| 4,190,394 | 2/1980 | Herzog et al. | 414/786 |
| 4,479,750 | 10/1984 | Johnson, Jr. | 414/339 X |

FOREIGN PATENT DOCUMENTS

| | | | |
|---|---|---|---|
| 980727 | 12/1975 | Canada | 414/392 |
| 911532 | 11/1962 | United Kingdom | 414/392 |

*Primary Examiner*—David A. Bucci
*Attorney, Agent, or Firm*—Robert C. Baker

[57] ABSTRACT

The straddle apparatus for loading and unloading gondola and similar-type railcars is mobile for movement into a position straddling a railcar on railroad tracks. It has a platform supported by leg members adjustable to vary the elevation of the platform above the railcar. A boom mount structure is fixed to the front portion of the platform. Stabilizing assemblies are also mounted at the front edge of the platform for swinging downwardly to abut upper surface lateral edges of the railcar with an operator-selected degree of pressure to reduce lateral wobble movement and longitudinal roll movement of the railcar during loading and unloading operations. The stabilizing assemblies also give additional support to the boom assembly during the material handling operations of loading and unloading.

12 Claims, 4 Drawing Sheets

RAILCAR STRADDLE FOR MATERIAL HANDLING

BACKGROUND OF THE INVENTION

This invention relates to an apparatus and a method for material handling, and more particularly relates to material handling in loading and unloading a railcar.

A commonly used approach for loading and unloading railcars has involved the use of a mobile apparatus which is perched upon the top of a railcar so as to derive all support from the railcar during material handling operations and even during movement of the apparatus from one railcar to another. This approach has the disadvantage of imposing all of the weight of the apparatus upon the upper surface of the walls of a gondola railcar, a burden for which the walls are not designed. Also, because this approach relies upon the railcar for total support, there is no independent stabilization support of the railcar for the purpose of restricting lateral wobble movement and longitudinal roll movement of the railcar during the rigors of loading and unloading. Apparatus perched atop a railcar in fact contributes to lateral wobble movement because of the high center of gravity.

An alternative approach for loading and unloading railcars has been that of using mobile free-standing apparatus. When free-standing apparatus is used, the contact between the railcar and the apparatus is minimal or non-existent Lateral wobble movement and longitudinal roll movement of the railcar are unrestrained by this type of apparatus just as they are unrestrained by apparatus perched atop a railcar.

Insofar as known, no one has heretofore successfully provided highly mobile railcar loading and unloading apparatus of versatile character having features which permit an operator to effect selected pressures on a railcar so as to reduce or eliminate lateral wobble movement and also longitudinal roll movement during loading and unloading operations, plus features which allow an operator to take advantage of a selected degree of railcar support for boom operations of loading and unloading, and also features which at the same time save undue weight impact on parts of the railcar not originally designed to withstand the full weight of loading and unloading apparatus. It is to a solution of this problem that this invention is directed.

SUMMARY OF THE INVENTION

The present invention introduces mobile apparatus having an adjustable-height free-standing platform which an operator may at any time vary in height above a railcar and above any cargo carried by it. The present invention also provides stabilizing assemblies for applying an operator-selected amount of pressure upon the railcar to reduce or eliminate lateral wobble movement and longitudinal roll movement of the railcar. The free-standing character of the apparatus of the invention eliminates the need for railcar support of the apparatus, while the stabilizing assemblies allow the operator to not only control unwanted railcar movements, but also to optionally use the railcar as a means for providing modest additional support for the boom assembly during loading and unloading operations The new straddle apparatus of the invention is for the loading and unloading of a gondola or flatbed railcar having upper surface lateral edges and a height The straddle apparatus comprises a base assembly including a platform for bridging laterally over a railcar on railroad tracks The platform has front and rear edges and lateral side edges. Leg members depend from the lateral side edges of the platform to support the platform above the railcar in an elevated condition. Ground-engaging propulsion means at the bottom terminus of the leg members permit mobility for the entire straddle apparatus over the ground independently of any movement of a railcar. Actuatable means is provided for adjusting the length of the leg members so as to vary the elevated condition of the platform at any time independently of any railcar height The actuatable means includes mechanical means for non-drift maintenance of an operator-selected length for the leg members during periods of non-actuation of the actuatable means. Operator-controlled power means is provided for actuation of the actuatable means to effect variation of the length of the leg members.

The new apparatus also comprises a boom assembly including a boom mount structure which is supported on and fixed to the platform proximate to the front edge of it at a medial location between the lateral side edges of it. The boom mount structure has lateral sides. A boom support frame is pivotally supported on the boom mount structure at a central location between its lateral sides; and this support allows pivot motion of the boom mount structure in a horizontal plane. A boom arm of first and second ends is pivotally connected at its first end to the boom support frame to enable vertical plane motion of the boom arm. A dipper arm of first and second ends is pivotally connected at its first end to the second end of the boom arm to enable vertical plane motion of the dipper arm. A tool for material containment for loading and unloading operations is pivotally connected to the second or outer end of the dipper arm.

A further system or assembly of the new apparatus is that for stabilization. A stabilizing assembly is mounted on each lateral side of the boom mount structure. Each stabilizing assembly includes a stabilizer arm which has an outer free end and an inner end pivotally mounted on a lateral side of the boom mount structure to permit vertical pivot movement of the stabilizer arm. An abutment foot is mounted on the outer free end of the stabilizer arm. Hydraulic adjustment means is mounted between the stabilizer arm and the boom mount structure in a manner for effecting the vertical pivot movement of the stabilizer arm. The hydraulic adjustment means is operator-controlled and adapted to swing the outer free end of the stabilizer arm downward to effect pressure placement of the abutment foot on an upper surface lateral edge of the railcar under an operator-selected degree of pressure. The operator can select a degree of pressure sufficient to reduce or eliminate lateral wobble movement and also longitudinal roll movement of the railcar during loading and unloading operations and sufficient also to provide an operator-selected degree of additional support to the boom mount structure through the stabilizing arms during loading and unloading operations.

The free-standing nature of the straddle apparatus enables an operator to maintain ground support for the platform with the platform in elevated spaced relationship above the railcar during loading and unloading operations so that the railcar is saved from supporting any significant weight of the straddle apparatus.

The most preferred arrangement for the stabilizer arms is such that when the stabilizing arms are in a horizontal orientation, they form a V-like configuration with the boom mount structure at the vertex. The V-like configuration is characterized by a large obtuse angle measuring greater than 120 degrees and less than 170 degrees.

The invention also includes a material handling method wherein a gondola or flatbed railcar is stabilized against lateral wobble movement and longitudinal rolling movement and wherein partial railcar support is provided for a boom assembly during the material handling in loading or unloading operations.

The method comprises powering straddle apparatus of the invention over the ground to a position astride or straddling railroad tracks, adjusting the elevation of the platform of the apparatus to an operator-selected height above the uppermost height of the railcar and any load material carried by the railcar, and effecting relative linear motion in a horizontal direction between the apparatus and the railcar to cause a relative relationship between the boom assembly and the railcar for movement of the tool to accomplish loading or unloading of the railcar. The method further includes the step of swinging the outer free ends of the stabilizer arms downward into pressure placement of each abutment foot upon upper surface lateral edges of the railcar to an operator-selected degree of pressure sufficient to reduce or eliminate lateral wobble movement and also longitudinal roll movement of the railcar during loading or unloading operations and sufficient to provide an operator-selected degree of additional support through the stabilizing arms to the boom mount structure during loading or unloading operations. A still further method step is that of pivoting the boom arm, the dipper arm and the tool for material containment in folding and unfolding action for loading or unloading the railcar while maintaining the pressure placement of the abutment feet on the railcar and while also maintaining ground support for the apparatus with the platform in elevated condition above the railcar so as to save the railcar from any significant weight support of the apparatus.

Still other benefits and advantages of this invention will be evident as this description proceeds.

DESCRIPTION OF THE PREFERRED EMBODIMENT

Figure 1:
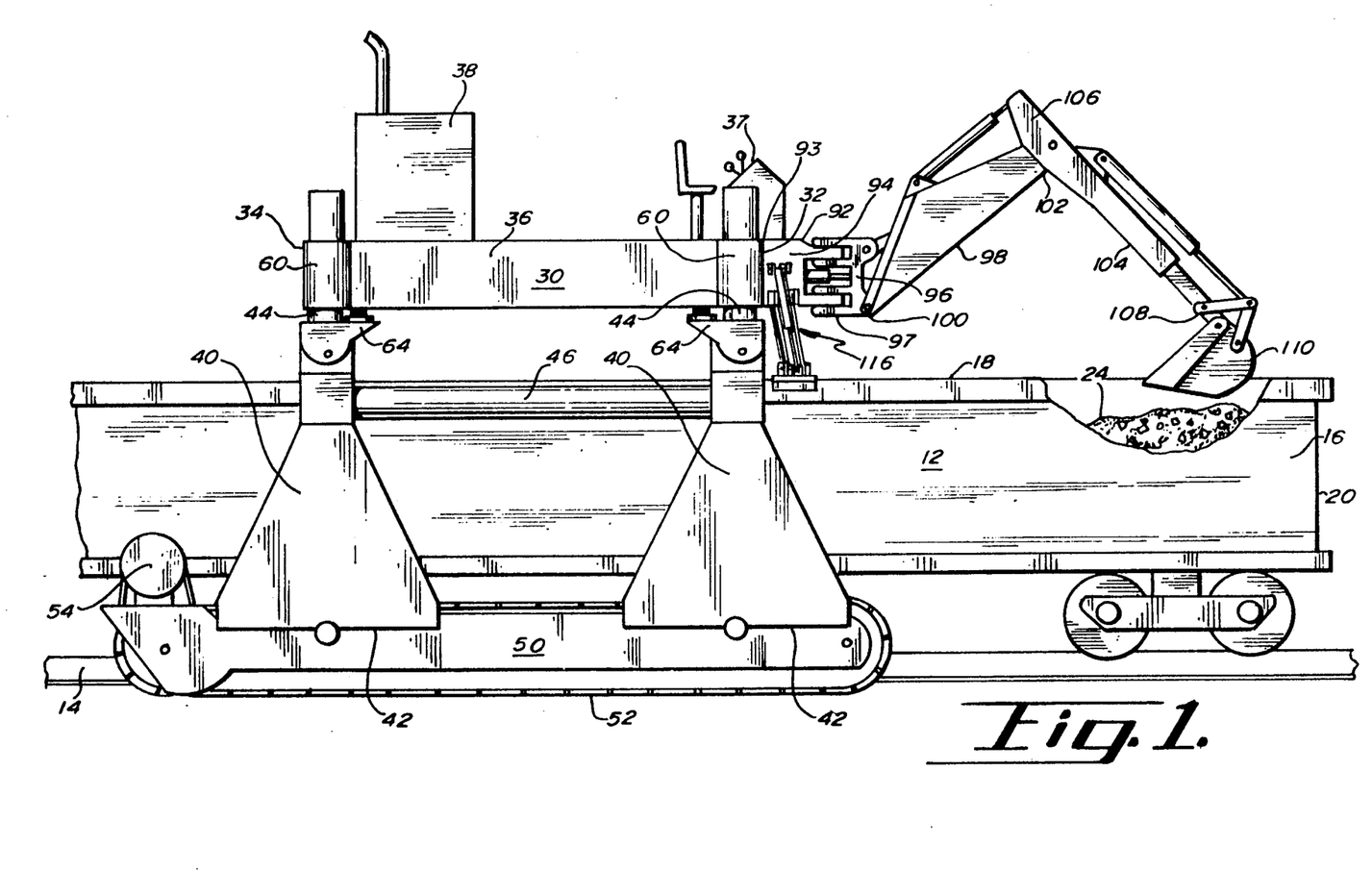
FIG. 1 is a schematic side elevation view of the new straddle apparatus astride a railcar (with a partial cutaway showing its cargo) on railroad tracks.
Figure 2:
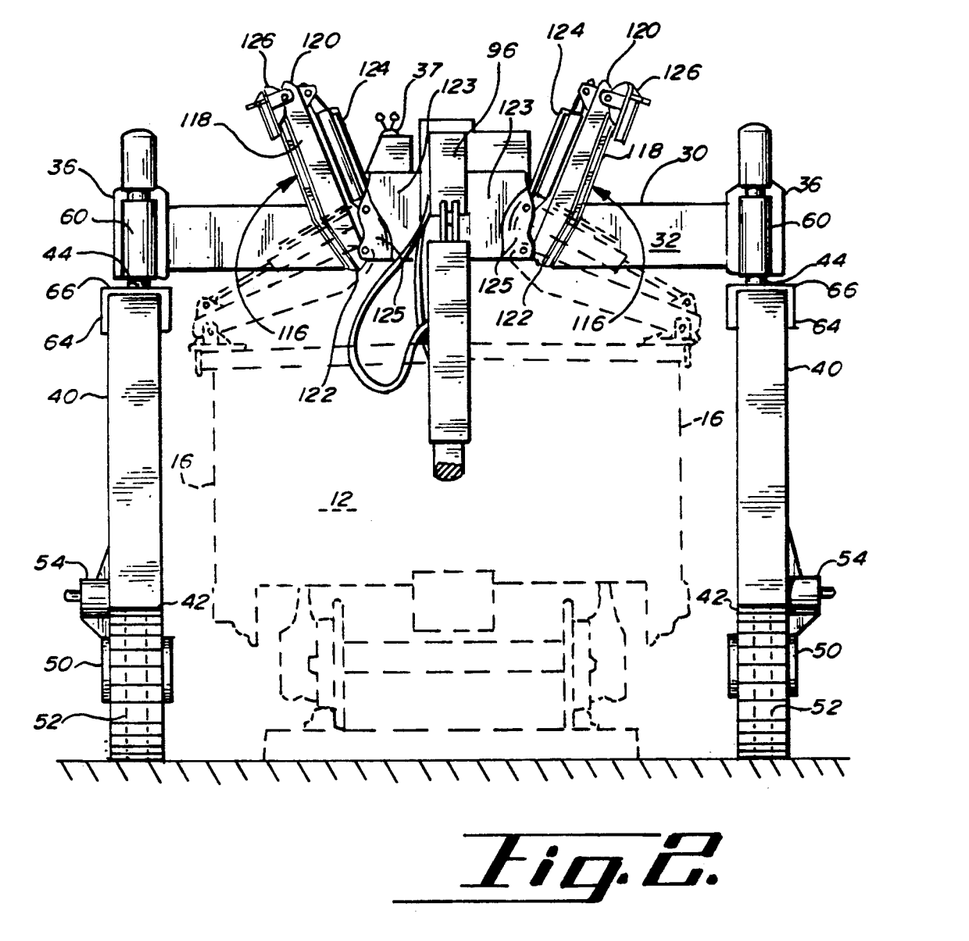
FIG. 2 is a schematic front elevation view of the straddle apparatus, with parts broken away, showing the stabilizing assemblies in a retracted position; this figure includes a phantom showing of a railcar with the stabilizer assemblies in pressure placement thereon.

Referring to FIGS. 1 and 2, the general features of the preferred embodiment of the straddle apparatus will first be described. The straddle apparatus as shown includes generally a platform frame 30 supported by legs 40 riding on ground engaging propulsion means 50. Mounted on the front of the apparatus is an boom implement 110 for material handling. In the preferred embodiment the boom implement 110 comprises a transverse bucket or backhoe, preferably of a width about as wide as the width of the interior of a gondola railcar. Near the juncture of the boom 98 and the platform 30 are two arms 118 designed to swing down into operator-selected pressure contact with lateral edges 18 of railcar 12 for the purpose of restricting unwanted movement of the railcar during loading and unloading operations. Although the apparatus is described in reference to a gondola-type railcar, it will be evident to those skilled in the art that the apparatus may be utilized on railcars of differing construction having upper surface lateral edges, including flatbed railcars.

The apparatus as viewed in FIGS. 1 and 2 is in typical operating orientation astride a railcar 12 situated on railroad tracks 14. The operation of the straddle apparatus is not dependent upon the presence of other railcars on the railroad tracks and performs equally well whether or not the railcar is linked to other railcars. A gondola-type railcar 12 is shown with lateral walls 16 having upper lateral edges 18. The typical gondola-type railcar also has end walls 20. The invention is useful for loading or unloading a wide variety of cargo material 24, including loose fill such as mined raw material, earth material, grain, stone, powders, rubble, etc. Still other types of cargo may also be suitably handled merely by changing the boom implement portion 110 of the apparatus. For example, the bucket may be replaced by claws for handling railroad ties.

The platform 30 is preferably of rectangular shape. It has a front edge 32 and a back or rear edge 34. These edges are in transverse relationship to the longitudinal direction of the railcar 12 and the railroad tracks 14 when the apparatus is in operating position for loading or unloading. The platform 30 also has lateral side edges 36 which extend between the platform front edge 32 and the platform rear edge 34. These side edges 36 are preferably substantially parallel. The entire apparatus has a suitable width and length to provide stable support of the boom assembly as material handling is accomplished. Many different vectors of force are transmitted to the platform during material handling without causing the apparatus to tip over. Also on the platform are the operator controls 37 and the power generating means 38 (such as a diesel engine) for operation of the various powered features of the apparatus.

The platform 30 is supported in an elevated condition above the ground by leg members 40. In the preferred embodiment, a forward and rearward leg member 40 on each side of the apparatus support the platform. Each leg member 40 has a bottom terminus 42 and upper terminus 44. The upper termini 44 are connected to the lateral side edges 36 of the platform 30 at a location proximate to the platform front edge 32 and the platform back edge 34. A horizontal cross-brace 46 extends between the two leg members 40 on each lateral side of the apparatus and holds them in rigidly spaced relationship. Each bottom terminus 42 of a leg member 40 is mounted to the ground-engaging propulsion means 50. Illustrative ground-engaging propulsion means comprises a pair of crawler track assemblies 52. Each crawler track 52 is oriented parallel to the platform lateral side edges 36 so as to be placed parallel to the railroad tracks 14 when the apparatus is used for loading or unloading. Suitable crawler track assemblies 52 are constructed of an continuous or endless belt of metal links entrained upon a plurality of grooved wheels mounted on a suitable frame. Each crawler track assembly 52 is powered by a hydraulic motor 54 hydraulically linked to any suitable pressure supply powered by the power unit 38 and controlled by an operator by any suitable control (e.g., one of controls 37). If desired, wheels such as rubber-tired wheels may replace the crawler tracks.

An actuatable means is provided for adjusting the length of the leg members 40 (between the platform and their lower terminus) for the purpose of adjusting the elevation of the platform above the ground and the railcar 12. A preferred embodiment for this feature is shown in detail in FIGS. 3 and 4. A leg slider 60 is fixed on the platform 30 for each individual leg upper terminus portion 44. The leg slider 60 is suitably of a hollow tube or sleeve shape, and provides a vertical recess or opening. The recess is suitably sized to closely fit about an upper terminus portion 44 of the leg member 40 in a manner allowing free vertical movement of the leg slider 60 along the upper terminus portion 44 of the leg member. The slider also serves to restrict any significant horizontal movement of leg member 40 with respect to the platform 30.

Figure 3:
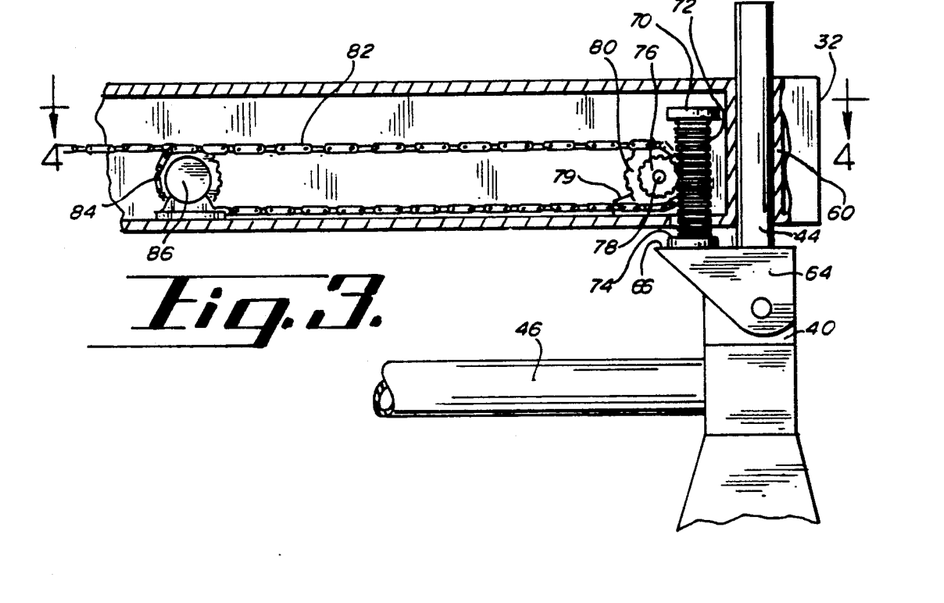
FIG. 3 is an enlarged schematic side elevation view of the upper portion of the right leg assembly of FIG. 1, with parts broken away and the cover elements removed to show features of interior structure for elevating the platform.
Figure 4:
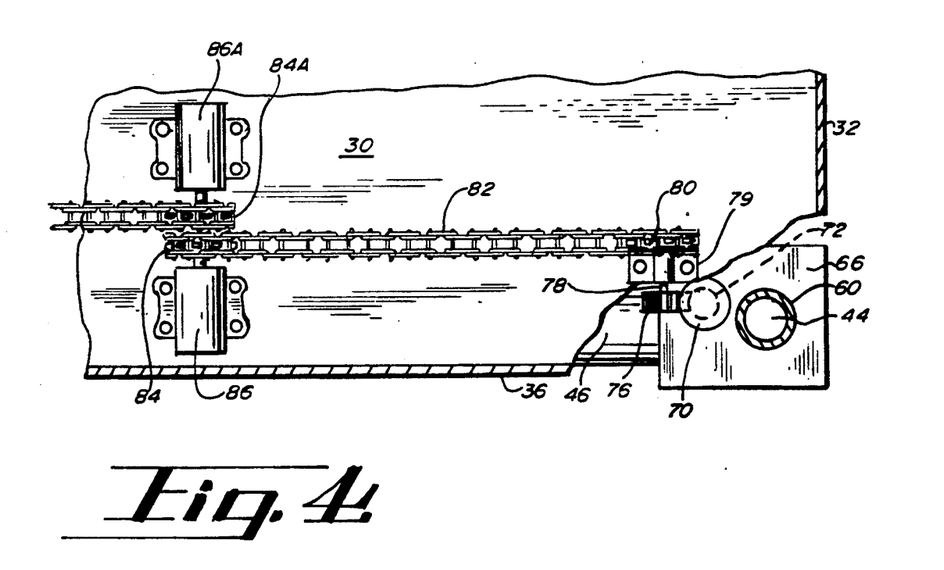
FIG. 4 is a schematic sectional view taken at line 4—4 in FIG. 3.

A support step 64 is mounted on each leg member 40 between the upper and lower extremities of the leg member. Each support step 64 forms a substantially horizontal surface 66 below the platform lateral side edge 36 and at a level below the lowest level of elevation desired for the platform. The support step is of sufficient strength to support that portion of the platform 30 that the leg member 40 is required to carry.

A support shaft 70 having a plurality of equally spaced circumferential ribs 72 along its length is vertically oriented and is parallel to the length of the slider-accommodated upper terminus portion 44 of leg member 40. The length of the support shaft 70 is generally somewhat greater than the total platform elevation adjustment capability. The support shaft 70 is mounted for easy vertical movement within a close fitting vertical recess in the platform 30; thus it is not rigidly connected to the platform 30. A bearing pad 74 rests on the horizontal surface 66 of the support step 64 and functions to secure the support shaft 70 to the support step 64.

Intermeshing with the ribs 72 of the support shaft 70 is an elevator gear 76. The elevator gear 76 is held in position against the ribs 72 by a horizontal shaft 78 on which gear 76 is mounted. The horizontal shaft 78 is journaled in any suitable bearing assembly fixed rigidly to the platform in any suitable manner. The arrangement is such that, when elevator gear 76 is rotated, it acts upon the ribs 72 with which it is intermeshed to move up and down the support shaft 70. The up and down movement of the elevator gear is transmitted through its shaft 78 to the bearing assembly for the shaft; and because the bearing assembly for the shaft is rigidly fixed to the platform 30, the up and down movement of the elevator gear serves to adjust the elevation of platform 30.

Rotation of elevator gear 76 is effected by elements now discussed. Fixed to an end of the shaft 78 opposite the elevator gear 76 is a driven gear or pulley 80. A chain 82 rides upon the driven gear or pulley 80, imparting to it rotational motion from the driving gear or pulley 84 about which the chain 82 also rides. Turning the driving gear or pulley 84 is a motor 86, preferably a hydraulic motor driven by any suitable hydraulic system powered by the power unit 38. Thus by controlling the turning of the motor 86, as through any suitable control 37, an operator controls the adjustment of the length of the leg members 40 and therefore the elevation of the platform 30. Pulley 84A and motor 86A operate in the same manner as described above for pulley 84 and motor 86 but act upon another leg member 40.

Other actuatable means for adjusting the length of the leg members 40 may alternatively be employed. A simplified embodiment may combine the upper terminus portion 44 of leg 40 (i.e., the part sliding in a slider 60) and the ribbed support shaft as one unit. Similarly, elevator gear 76 may be combined or incorporated as part of the leg slider 60 in a manner enabling the teeth of the elevator gear 76 to intermesh with the ribbed leg member. The significant feature of actuatable means for adjusting the platform elevation is that it provides non-drift maintenance of the platform elevation during periods when the actuatable means is not actuated by power transmission to it. In this respect, the mechanical features of the ribbed support shaft, cooperating elevator gear, driven pulley and the chain from the driving pulley, all contribute to non-drift or non-shift of elevation after power to the motor 86 is cut off by an operator. A purely hydraulic system (such as a hydraulic cylinder and ram) is relative undesirable for use in varying the elevation of the platform. The intense impulsive loads imposed upon the platform by the boom assembly operation during loading and unloading operations would likely allow the platform 30 to bounce due to changes of load pressure in a purely hydraulic system as boom operation takes place. This would interfere with the operation of the stabilizing assemblies 116 (see FIGS. 1, 2, 5, and 6) in restricting lateral and longitudinal movement of the railcar 12 and in maintaining an operator-selected amount of support for the boom assembly, the large components of which are the boom arm 98, dipper arm 104, and tool 110.

It should also be noted that length of the leg members 40 and thus the elevation of the platform 30 is not dictated by the height of the railcar and is selected by the operator based upon considerations of cargo height, boom assembly attack and stabilizer positioning.

Figure 5:
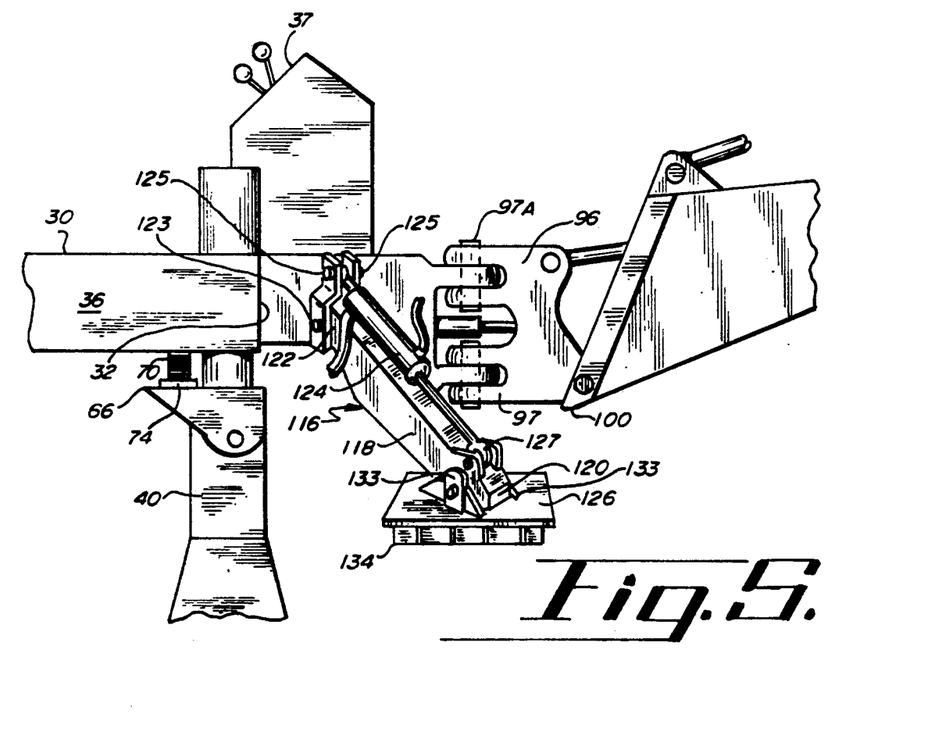
FIG. 5 is an enlarged schematic side elevation view of the boom assembly portion of the straddle apparatus of FIG. 1, with parts broken away, showing one stabilizing assembly and its relationship to the boom assembly.
Figure 6:
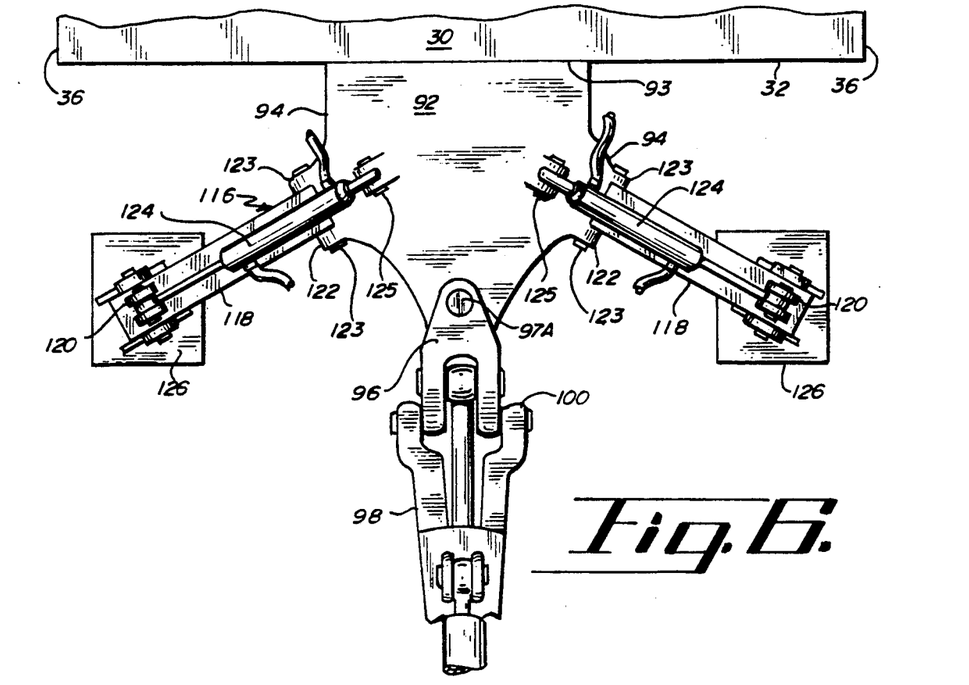
FIG. 6 is a schematic plan view of the boom assembly portion of the straddle apparatus with parts broken away, showing the relationship of the two stabilizing assemblies to the boom assembly.

FIG. 1 shows the general position of the boom assembly, and FIGS. 5 and 6 show details for the boom mount structure 92 and boom support frame 96. Supporting the boom assembly is the boom mount structure 92, which is rigidly mounted in fixed relationship to platform 30 at a centrally located juncture 93 proximate to or at the platform front edge 32. This mounting is suitable to withstand the large and impulsive forces transmitted through the boom support frame 96 to it during material handling operations. Boom mount structure 92 has lateral sides 94 of significant importance, as will later be explained.

A boom support frame 96 is pivotally mounted on the boom mount structure 92 by means of horizontally projecting ears 97 from each respective element overlappingly positioned with a vertically oriented pivot pin 97A joining those elements. The pivot connection allows the boom support frame 96 to move in horizontal pivot motion with respect to the boom mount structure 92. This pivoting connection allows the balance of the boom assembly (i.e., boom arm 98, dipper arm 104 and tool 110) to swing from a centered position over the railcar 12 in either lateral direction in order to move the tool 110 to a position lateral of the railcar 12 during loading or unloading operations (as necessary for placing material in or removing material from a laterally positioned hauling truck).

The boom arm 98 is pivotally mounted at its first end 100 to boom support frame 96. The pivot connection is oriented in a manner that allows the boom arm 98 to pivot in a vertical plane; and any suitable hydraulic means as conventionally known is used to effect the raising and lowering of the boom arm 98 in a vertical plane.

A dipper arm 104 is pivotally connected proximate to its first end 106 to the boom arm outer or second end 102. This pivot connection allows the dipper arm 104 to move in vertical plane pivotal motion. The tool or bucket 110 for material containment is pivotally connected to the dipper arm second end 108 to allow for vertical dipping and scooping motion of the tool 110.

The pivot connections for the boom support frame, the boom arm, dipper arm, and tool, as well as the hydraulic combinations for effecting pivot of these elements, are all well known and are graphically illustrated in the drawing, and need no detailed description. The actuation of the hydraulic combinations (e.g. hydraulic cylinder and ram combinations) is controlled by an operator by means of conventional hydraulic system controls 37 located on the platform 30.

The construction of the boom assembly enables it to engage the tool 110 with material held in the railcar 12 or laterally adjoining the railcar 12, to lift the tool 110 and contained material to a vertical height greater than any lateral walls 16 of the railcar 12, to swing the tool and material over any lateral wall 16 of the railcar 12, and deposit the material either in the railcar 12 interior or at a location laterally adjacent to the railcar 12.

An especially significant feature of the invention is that of the stabilizing assemblies 116. These are shown best in FIGS. 2, 5, and 6. A stabilizing assembly 116 is mounted on each lateral side 94 of the boom mount structure 92. Since the stabilizing assemblies 116 are of identical construction and merely act in opposite lateral directions, one such assembly will be described and it should be understood that the other respective stabilizing assembly 116 is the same except that it is mounted on the opposite side of the mount structure 92.

A stabilizing assembly 116 has a stabilizer arm 118. The stabilizer arm 118 in preferred form is a substantially linear elongated rigid body having an outer free end 120 and inner end 122. The inner end 122 is pivotally mounted to the inner pivot mount 123 located on the boom mount structure lateral side 94. The inner pivot mount 123 allows the stabilizer arm outer free end 120 to swing in substantially vertical motion. FIG. 2 shows the stabilizer arms 118 in retracted position and also, by phantom, in a stabilizer position on the upper surface lateral edge of a railcar.

As shown particularly in FIG. 5, the stabilizing assembly inner pivot mount 123 in the preferred embodiment is in a pair of flanges which also provide the pivot mount 125 for the hydraulic adjustment means 124 used to effect the vertical movement of the stabilizer arm 118. The hydraulic adjustment means 124 in the preferred embodiment comprises a hydraulic combination 124 consisting of a hydraulic cylinder and ram. Its inner pivot mounting 125 on lateral side 94 of the boom mount structure 92 is spaced above the pivot 123 for the stabilizer arm 118. The outer pivot mounting 127 for the opposite end of the hydraulic combination 124 is on ears fixed to the outer or free end of the stabilizer arm 118. Thus the stabilizer arm 118 and hydraulic means 124 cooperatively pivot in vertical movement upon operator actuation of the hydraulic combination 124.

As illustrated, the inner pivot mount 123 for the stabilizer arm 118 and inner pivot mount 125 for the hydraulic means 124 are situated in parallel flanges which function as ears protruding from the boom mount structure lateral side 94. The flanges provide vertically spaced ear sets one holding the stabilizer arm inner pivot mount 123 and the other holding the hydraulic combination inner pivot mount 125. The pivot pins for these are parallel so as to provide smooth vertical pivot motion.

Pivotally mounted to the stabilizer arm outer free end 120 is an abutment foot 126. The abutment foot 126 forms the only point of contact between the railcar 12 and the straddle apparatus. This foot 126 is suitably comprised of a plate having an upper surface and a lower surface. Connected to the plate upper surface is the abutment foot pivot mount 133 for pivot connection of it to the stabilizer arm outer free end 120. A flange 134 suitably may depend perpendicular from the laterally outermost portion of the lower surface of foot 126. Flange 134 is located at the extremity of the abutment foot 126 most distant from the boom mount structure 92.

The angular direction of the stabilizer arms 118 is most preferably other than perpendicular to the longitudinal direction or axis of the apparatus. They are preferably positioned so that each stabilizer arm is angled slightly forward toward the tool 110 and away from a transverse line across the platform front edge 32. The two stabilizer arms thus form a V-like configuration with the boom mount structure 92 at the vertex. The V-like configuration is characterized by an obtuse included angle greater than 120 degrees and less than 170 degrees. The angling of the stabilizer arms 118 away from the front edge of the platform serves to form a triangular support for the boom mount 92. In the preferred embodiment, the angle of each stabilizer arm 118 of each assembly 116 is fixed at about 70 degrees from a vertical plane bisecting the apparatus into left and right halves (i.e., about 70 degrees from a plane along the longitudinal axis of the straddle apparatus). Angulation as large as 85 degrees from the bisecting plane, and as small as 60 degrees from the bisecting plane, is useful. As the stabilizer arm angulation is decreased toward 60 degrees, the support given to the boom mount structure 92 tends to increase (assuming all other conditions are equal, including pressure placement of the feet of the stabilizing assemblies). However, such greater support is accompanied by relatively greater weight transfer from the boom mount structure 92 to the lateral edges 18 of the railcar 12. Thus, the most preferred angulation for boom mount structure support and railcar stabilization against wobble and longitudinal movement, with reasonable weight transferred to the railcar during loading and unloading operations, is that between the aforenoted extremes.

The straddle apparatus is self-propelled and easily powered over the ground to a position straddling railroad tracks. The height of the platform, if not previously adjusted by an operator to position above the uppermost height of a railcar to be loaded or unloaded (and above any load material in the railcar), is at this point at least preliminarily adjusted to such position. Then either the apparatus or a railcar is moved to cause a relative relationship between the boom assembly and the railcar that permits movement of the tool or bucket of the apparatus into and out of the railcar for loading or unloading. However, before operating the tool for loading or unloading, the stabilizer assemblies are placed in position. This is done by the operator by actuating the hydraulic systems 124 for the stabilizing arms so as to swing the outer ends of the stabilizer arms into pressure placement of the feet of those arms upon upper surface lateral edges of the railcar. Any suitable operator control elements are useful for effecting adjustment of the hydraulic adjustment means 124, control systems 37 being illustrative. The operator controls the degree of pressure placement of those feet so that the pressure is sufficient to at least reduce if not entirely eliminate lateral wobble movement (as well as longitudinal roll movement) of the railcar during loading or unloading operations using the tool of the boom assembly This pressure placement, as selected by the operator, is also sufficient to provide additional support, through the stabilizer arms, for the boom mount structure as the boom arm and dipper arm and tool are pivoted in folding and unfolding action for loading or unloading the railcar As the folding and unfolding of those elements takes place, the pressure placement of the abutment feet on the upper surface lateral edges of the railcar is maintained, and ground support for the straddle apparatus (with the platform above the railcar) is also maintained Thus the railcar is saved from supporting any significant weight of the apparatus.

As those skilled in the art of loading and unloading railcars will appreciate, periodic linear shift between a railcar and the apparatus is needed for implement access to various parts of the length of the railcar. This too is easily accomplished when the apparatus of the invention is employed.

Not least of the benefits of the invention is the high degree of operator safety provided. Apparatus that crawls up and is supported on top of railcars inherently subjects the operator of the same to risks not suffered when the apparatus of this invention is used.

Those skilled in the art will readily recognize that this invention may be embodied in other specific forms than illustrated without departing from the spirit or essential characteristics of it. The illustrated embodiments are therefore to be considered in all respects illustrative and not restrictive, the scope of the invention being indicated by the appended claims rather than the foregoing description; and all variations that come within the meaning and range of equivalency of the claims are therefore intended to be embraced thereby.

That which is claimed:

1. A mobile straddle apparatus for material loading and unloading of a gondola or flatbed railcar having upper surface lateral edges and a height, said apparatus comprising (i) a base assembly comprising a platform for bridging laterally over a railcar on railroad tracks, said platform having front and rear edges and lateral side edges, leg members depending from said platform lateral side edges for supporting said platform above said railcar in an elevated condition said leg members having a bottom terminus and a length ground-engaging propulsion means at the bottom terminus of said leg members for moving said entire straddle apparatus over the ground independently of any movement of said railcar, actuatable means for adjusting the length of said leg members to vary said elevated condition of said platform at any time independently of any railcar height, said actuatable means including mechanical means for non-drift maintenance of an operator-selected length for said leg members during periods of non-actuation of said actuatable means, and operator-controlled power means for actuation of said actuatable means, (ii) a boom assembly, said boom assembly comprising a boom mount structure supported on and fixed to said platform proximate to said front edge thereof at a medial location between the lateral edges of said platform, said boom mount structure having lateral sides, a boom support frame pivotally supported on said boom mount structure for pivot motion of said boom support frame in a horizontal plane, a boom arm having first and second ends, said boom arm first end being pivotally connected to said boom support frame for vertical plane motion of said boom arm, a dipper arm having first and second ends, said dipper arm first end being pivotally connected to said boom arm second end for vertical plane motion of said dipper arm, and a tool for material containment pivotally connected to said dipper arm second end for loading and unloading operations, and (iii) a stabilizing assembly mounted on each lateral side of said boom mount structure, each said stabilizing assembly comprising a stabilizer arm having an outer free end and an inner end pivotally mounted on a said lateral side of said boom mount structure for vertical pivot movement of said stabilizer arm, an abutment foot mounted on said stabilizer arm outer free end, and hydraulic adjustment means mounted between said stabilizer arm and said boom mount structure in a manner for effecting said vertical pivot movement of said stabilizer arm, said hydraulic adjustment means of each said stabilizing assembly being operator-controlled and adapted to swing the outer free end of said stabilizer arms downwardly to effect pressure placement of said abutment feet on an upper surface lateral edge of said railcar under an operator-selected degree of pressure sufficient to reduce or eliminate lateral wobble movement and also longitudinal roll movement of said railcar during loading and unloading operations, and sufficient also to provide an operator-selected degree of additional support to said boom mount structure through said stabilizing arms during loading and unloading operations while said leg members simultaneously maintain ground support for said straddle apparatus with said platform in elevated spaced relationship above said railcar so that said railcar is saved from support of any significant weight of said straddle apparatus.

2. The apparatus of claim 1 wherein the pivot mounting of the inner end of each said stabilizer arm on a lateral side of said boom mount structure is such that the vertical pivot movement of the stabilizer arm lies in a plane between 60 and 85 degrees from a plane bisecting said apparatus into left and right halves.

3. The apparatus of claim 1 wherein said stabilizer arms are so mounted at their inner ends that said stabilizer arms, when pivoted to a horizontal orientation, form a V-like configuration having said boom mount structure at the vertex of said V-like configuration, said V-like configuration being characterized by a large obtuse included angle measuring greater than 120 degrees and less than 170 degrees.

4. The apparatus of claim 1 wherein said actuatable means for adjusting the length of said leg members comprises a ribbed vertical support shaft fixedly carried on a said leg member, a rotatable elevator gear fixedly mounted on said platform in intermeshed relationship to said ribbed support shaft, and linkages for transmitting power for turning said elevator gear to move said elevator gear up and down said ribbed support shaft, thereby to adjust the length of said leg member and vary the elevated condition of said platform.

5. The apparatus of claim 4 wherein said mechanical means for non-drift maintenance of an operator selected length for said leg member consists essentially of said ribbed support shaft, said elevator gear and said linkages for transmitting power.

6. The apparatus of claim 1 wherein the groundengaging propulsion means comprises endless belts comprised of metal links.

7. A material handling method wherein a gondola or flat railcar having upper surface lateral edges and a height and resting on railroad tracks supported on the ground is stabilized against lateral wobble movement and longitudinal rolling movement and wherein partial railcar support is provided for a boom assembly during the material handling in loading or unloading operations, comprising:

a) powering a straddle apparatus over the ground to a position straddling the railcar on the railroad tracks, said straddle apparatus comprising a platform for bridging laterally over the railcar on the railroad tracks, leg members depending from said platform for supporting said platform above said railcar in an elevated condition, said leg members having a bottom terminus and a length, groundengaging propulsion means at the bottom terminus of said leg members for moving said entire straddle apparatus over the ground independently of any movement of said railcar, actuatable means for adjusting the length of said leg members to vary said elevated condition of said platform at any time independently of any railcar height, operator-controlled power means for actuation of said actuatable means, a boom assembly, said boom assembly comprising a boom mount structure supported on and fixed to said platform, said boom mount structure having lateral sides, a boom support pivotally mounted to said boom mount structure, a boom arm pivotally mounted to said boom support, a dipper arm pivotally mounted to said boom arm, and a tool for material containment pivotally mounted to said dipper arm, and a stabilizing assembly mounted on each lateral side of said boom mount structure, each said stabilizing assembly comprising a stabilizer arm having an outer free end and an inner end pivotally mounted on said boom mount structure to permit vertical pivot movement of said stabilizer arm, an abutment foot mounted on said stabilizer arm outer free end, and hydraulic adjustment means mounted between said stabilizer arm and said boom mount structure in a manner for effecting said vertical pivot movement of said stabilizer arm, said hydraulic adjustment means being operator controlled and adapted to swing the outer free end of said stabilizer arm downward to effect pressure placement of said abutment foot on an upper surface lateral edge of said railcar under an operator-selected degree of pressure;

b) actuating said actuatable means by said operator-controlled power means to effect adjustment of said elevated condition of said platform to an operator-selected height above the uppermost height of said railcar and any load material carried by said railcar;

c) effecting relative linear motion in a horizontal direction between said straddle apparatus and said railcar to cause a relative relationship between said boom assembly and said railcar for movement of said tool to accomplish loading or unloading of said railcar;

d) actuating said hydraulic adjustment means of each said stabilizing assembly to swing the outer free ends of said stabilizer arms downwardly into pressure placement of each said abutment foot upon upper surface lateral edges of said railcar to an operator-selected degree of pressure sufficient to reduce or eliminate lateral wobble movement and also longitudinal roll movement of said railcar during loading or unloading operations and sufficient to provide an operator-selected degree of additional support through said stabilizing arms to said boom mount structure during loading or unloading operations; and e) pivoting said boom assembly of said boom arm, said dipper arm and said tool for material containment in folding and unfolding action for loading or unloading of said railcar while maintaining said pressure placement of each said abutment foot upon said upper surface lateral edge of said railcar and while also maintaining ground support for said straddle apparatus with said platform in elevated spaced relationship above said railcar so that said railcar is saved from supporting any significant weight of said straddle apparatus.

8. A mobile straddle apparatus for material loading and unloading of a gondola or flatbed railcar having upper surface lateral edges and a height, said apparatus comprising (i) a base assembly comprising a platform for bridging laterally over a railcar on railroad tracks, said platform having front and rear edges and lateral side edges, leg members depending from said platform lateral side edges for supporting said platform above said railcar in an elevated condition said leg members having a length ground-engaging propulsion means supporting said leg members, said propulsion means being for moving said entire straddle apparatus over the ground independently of any movement of said railcar, actuatable means for adjusting the length of said leg members to vary said elevated condition of said platform at any time independently of any railcar height, and operator-controlled power means for actuation of said actuable means, (ii) a boom assembly, said boom assembly comprising a boom mount structure supported on and fixed to said platform proximate to said front edge thereof at a medial location between the lateral edges of said platform, said boom mount structure having lateral sides, a boom support frame pivotally supported on said boom mount structure for pivot motion of said boom support frame in a horizontal plane, a boom arm pivotally connected to said boom support frame for vertical plane motion of said boom arm, a dipper arm pivotally connected to said boom arm, and a tool for material containment pivotally connected to said dipper arm for loading and unloading operations, and (iii) a stabilizing assembly mounted on each lateral side of said boom mount structure, each said stabilizing assembly comprising a stabilizer arm having an outer free end and an inner end pivotally mounted on a said lateral side of said boom mount structure for vertical pivot movement of said stabilizer arm, in abutment foot mounted on said stabilizer arm outer free end, and hydraulic adjustment means mounted between said stabilizer arm and said boom mount structure in a manner for effecting said vertical pivot movement of said stabilizer arm, said hydraulic adjustment means of each said stabilizing assembly being operator-controlled and adapted to swing the outer free end of said stabilizer arms downward to effect pressure placement of said abutment feet on an upper surface lateral edge of said railcar under an operator-selected degree of pressure sufficient to reduce or eliminate lateral wobble movement and also longitudinal roll movement of said railcar during loading and unloading operations, and sufficient also to provide an operator-selected degree of additional support to said boom mount structure through said stabilizing arms during loading and unloading operations while said leg members simultaneously maintain ground support for said straddle apparatus with said platform in elevated spaced relationship above said railcar so that said railcar is saved from support of any significant weight of said straddle apparatus.

9. The apparatus of claim 8 wherein the pivot mounting of the inner end of each said stabilizer arm on a lateral side of said boom mount structure is such that the vertical pivot movement of the stabilizer arm lies in a plane between 60 and 85 degrees from a plane bisecting said apparatus into left and right halves.

10. The apparatus of claim 8 wherein said stabilizer arms are so mounted at their inner ends that said stabilizer arms, when pivoted to a horizontal orientation, form a V-like configuration having said boom mount structure at the vertex of said V-like configuration, said V-like configuration being characterized by a large obtuse included angle measuring greater than 120 degrees and less than 170 degrees.

11. The apparatus of claim 8 wherein said actuatable means includes mechanical means for non-drift maintenance of an operator selected length for said leg members during periods of non-actuation of said actuable means.

12. The apparatus of claim 8 wherein the ground-engaging propulsion means comprises endless belts comprised of metal links.

* * * * *

UNITED STATES PATENT AND TRADEMARK OFFICE
CERTIFICATE OF CORRECTION

PATENT NO. : 5,120,180
DATED : Jun. 9, 1992
INVENTOR(S) : Edward A. Egan and Kenneth L. Kellen It is certified that error appears in the above—identified patent and that said Letters Patent is hereby corrected as shown below:

Column 1, line 30, read a period after "non-existent".

Column 1, line 67, read a period after "height".

Column 2, line 12, read a period after "height".

In claim 1, at column 10, line 5, read a comma after "length".

In claim 6, at column 11, line 28, "grounden-" should read "ground-en-".

In claim 8, at column 12, line 59, read a comma after "length".

In claim 8, at column 13, line 21, "in abutment foot" should read "an abutment foot".

Signed and Sealed this

Eighteenth Day of January, 1994

Attest:

BRUCE LEHMAN

*Attesting Officer*     *Commissioner of Patents and Trademarks*